United States Patent [19]
Terao et al.

[11] 4,296,419
[45] Oct. 20, 1981

[54] MEMBER FOR RECORDING INFORMATION

[75] Inventors: Motoyasu Terao, Tokyo; Kazuo Shigematsu, Kawasaki; Masahiro Ojima, Kokubonji; Seiji Yonezawa, Hachioji, all of Japan

[73] Assignee: Hitachi, Ltd., Tokyo, Japan

[21] Appl. No.: 76,424

[22] Filed: Sep. 17, 1979

[30] Foreign Application Priority Data

Sep. 19, 1978 [JP] Japan ............................ 53-127535[U]

[51] Int. Cl.³ ................................................ G01D 15/34
[52] U.S. Cl. ................................ 346/135.1; 346/76 L; 430/271; 430/945
[58] Field of Search ......................... 346/135.1, 76 L; 430/945, 271

[56] References Cited

U.S. PATENT DOCUMENTS

| 3,720,784 | 3/1973 | Maydan | 346/76 LX |
| 3,990,084 | 11/1976 | Hamisch | 346/135.1 |
| 4,000,492 | 12/1976 | Willens | 346/135.1 X |
| 4,188,214 | 2/1980 | Kido | 346/135.1 X |
| 4,238,803 | 12/1980 | Terao | 346/135.1 X |

FOREIGN PATENT DOCUMENTS

| 1178696 | 1/1970 | United Kingdom . |
| 1260751 | 1/1972 | United Kingdom . |
| 1376836 | 12/1974 | United Kingdom . |
| 1491508 | 11/1977 | United Kingdom . |

Primary Examiner—Joseph W. Hartary
Attorney, Agent, or Firm—Craig and Antonelli

[57] ABSTRACT

A recording member in which a bismuth-antimony alloy thin film containing antimony as its indispensable component is deposited on a predetermined substrate is disclosed. The Sb content of the film lies in a range of from 1 % to 15 % inclusive in terms of the average atomic-%. Preferably, the Sb content has the average value held in the specified range, and it is gradually increased in the thickness direction of the film so that in the part near the substrate and/or front surface of the film, the maximum content may lie within a range of at most three times the average content of other part of the film.

20 Claims, 7 Drawing Figures

MEMBER FOR RECORDING INFORMATION

BACKGROUND OF THE INVENTION

1. Field of the Invention

This invention relates to a member for recording information. More particularly, it relates to a recording member which exploits the removal by vaporization, the deformation, etc. of a recording thin film formed on a substrate as effected with heat from a recording beam such as laser beam or with heat generated indirectly through auxiliary means.

2. Description of the Prior Art

A method of recording information onto a disk and playing them back therefrom by the use of light is stated in, for example, a literature "A Review of the MCA Disco-Vision System" presented by Kent Broadbent in the 15th SMPTE Technical Conference & Equipment Exhibit. Hereunder, the principle will be briefly explained.

FIG. 1 is a diagram which illustrates the principle of the method of recording information on a predetermined medium, for example, a disk by the use of light. The disk is such that a thin film for recording 2 is deposited on the surface of a transparent circular substrate 1 which is made of glass, a synthetic resin or the like. It is rotated at high speed with a shaft 3 used as a rotary shaft. Under the state under which a lens 4 is brought close up to a predetermined distance from the disk 1, a laser beam 5 which is modulated into the form of pulses in correspondence with information to-be-recorded (not only the laser, but also an electron beam etc. can be employed as the beam) is focused and projected onto the recording thin film 2. Thus, those parts of the recording film 2 on which the laser beam 5 has been projected are heated by the laser beam and are fused and deformed or vaporized off. As a result, the shapes, sizes and positions of apertures or recesses which are formed in the recording thin film 2 and which have minor diameters of approximately 0.5 μm–1.2 μm correspond to the information applied through the laser beam. That is, the information such as pictures and voices are recorded in the recording thin film 2 in the form of the apertures or recesses. The recorded information can be played back in such a way that, while rotating the disk 1 at high speed similarly to the above, a laser beam is condensed and projected onto the recording thin film of the disk 1 in which the information have been recorded, so as to detect e.g. the intensities of reflected light. Heretofore, recording materials of good recording characteristics have been investigated. Any of the recording materials hitherto proposed, however, has been unsatisfactory in points of the quality of a recorded picture, etc.

In addition to the method as above stated wherein the laser beam or the like is used as the recording beam and the information are recorded by exploiting the vaporization or the fusion and deformation of the recording member, there is a method as stated below. In this method, a thin film whose threshold voltage for electrical switching lowers upon projection of light is held between electrodes on both sides. The thin film is illuminated with a voltage applied thereto, and thus causes the switching in the illuminated part. Parts of the electrodes adjoining the switched part are perforated by heat generated by the switching. Thus, an information is recorded. Except the property of being electrically conductive, properties which are required of the material of the electrode serving also as the recording member in this case are substantially the same as those which are required of the recording member in the foregoing case of the direct recording resorting to the heat of the laser beam projection. Accordingly, a recording member which is electrically conductive can be employed for both the methods.

The following references are cited to show the state of the prior art:

Japanese Patent Application Publication No. 40479/1971;

U.S. Patent Application Ser. No. 829,892 now U.S. Pat. No. 4,238,803;

Japanese Patent Application Laying-open No. 17144/1974.

SUMMARY OF THE INVENTION

An object of this invention is to provide a recording member which is more excellent in recording characteristics, higher in sensitivity and stable for a longer period than the prior-art ones of the same type for use in the information recording methods as stated previously. The recording member has no problem as to the chemical toxicity of the material itself.

The recording member of this invention is such that a bismuth-antimony (Bi-Sb) alloy thin film which contains antimony (Sb) as its indispensable component is deposited on a predetermined substrate. In this case, the Sb content of the thin film lies in a range of from 1% to 15% inclusive in terms of the percentage of the average number of atoms in the thin film. Regarding the Sb content, it is especially preferable that the average value lies within the range specified above and that in either part near the front or rear surface of the thin film or on both the parts of the film, the maximum content (that is, the average value over a 100 Å-thick part which includes the maximum point at the center) is within a range of at most three times the average content of other part of the thin film. Of course, it is preferable that the content varied gradually in the direction of thickness of the thin film. A part including only Sb may exist if it is not greater than 5 nm in the thickness direction.

With such thin film, when information are recorded by forming apertures or recesses in the thin film by the fusion and deformation or the vaporization and removal thereof owing to heat generated upon projection of a laser beam or to heat generated indirectly through auxiliary means, the recording sensitivity is high, and a high signal-to-noise ratio is attained in cases of the recording of video signals, etc.

DETAILED DESCRIPTION OF THE INVENTION

Figure 1:
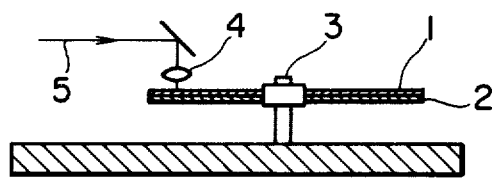
FIG. 1 is a view for explaining the principle of a method of recording information on a recording member.

As stated before, the recording member according to this invention is formed by depositing a bismuth-antimony alloy thin film which contains antimony as its indispensable component.

The reasons why a small quantity of Sb is added into Bi in the recording member of this invention are as stated below. The addition of Sb makes clean the shapes of openings which are formed in the thin film by the projection of a laser beam or the like. Secondly, a Bi recording layer has its recording characteristic deteriorated with the lapse of time because the sulfide or oxide of Bi is produced with the time. Sb suppresses the deterioration. Thirdly, in such case where a substrate made of an organic substance is employed, Sb is effective to prevent the deterioration of the recording characteristic with the lapse of time as is attributed to the reaction between the organic substance and Bi. However, when the content of Sb is too low, no effect is achieved, and when it is too high, the shapes of the openings are disordered and the power of the laser beam necessary for the recording becomes high.

The Sb content should preferably be in a range of from 1% to 15% inclusive in terms of the percentage of the number of atoms. A more preferable content of Sb is in a range of from 2% to 10% inclusive. To add In and/or Zn as elements other than Sb up to 10% in terms of the percentage of the number of atoms in dependence on the Sb content has the effects of reducing the laser beam power necessary for the recording, etc. Besides, various metals, semi-metals, or semiconductors such as Ge may be added at most 10% in terms of the percentage of the number of atoms in dependence on the Sb content.

The Sb content in the Bi-Sb alloy thin film does not always need to be uniform in the direction of the thickness of the thin film. When Sb is added in a larger amount in the part near the rear surface of the thin film, in other words, in the part close to the substrate, the reaction between Bi and the substrate is effectively prevented. When Sb is added in a larger amount in the part near the front surface of the thin film, there is the effect of preventing the production of the sulfide or oxide of Bi in the front surface. Since, however, the shapes of the openings are disordered, the total quantity of Sb cannot be made very large, and the Sb content should preferably lie in the specified range as the average in the thickness direction of the thin film. The Sb content is made higher in either part near the front or rear surface of the thin film or on both the parts, whereas it is made lower in the other part of the thin film (rear surface, front surface or mid-layer part). Also in this case, when the Sb content is too high near the front or rear surface and is too low in the other part, the shapes of the openings which are obtained upon the projection of the laser beam are disordered. It is therefore desirable that the Sb content in the part near the front or rear surface of the thin film is confined to at most three times the average Sb content in the other part and that it is gradually varied in the thickness direction of the film. However, a part which includes only Sb may exist if it is not greater than 5 nm in the thickness direction of the film.

When a chalcogenide layer, an oxide layer or an organic polymer layer is disposed between the Bi-Sb thin film as above stated and the substrate or on the Bi-Sb thin film, the recording characteristic shows a tendency to be improved and that the stability of the film also to be increased. As the chalcogenide, there can be employed any of ones containing Ge-Se, Ge-S, Ge-Te, Sb-S, Sb-Se, Sn-S, Sn-Se, In-Se, As-Te, As-Se, As-S, etc. As the oxide, there can be employed any of ones of Te, Sb, Cd, Bi, Ge, Si, etc. It is particularly preferable that the thickness of this layer is not greater than 40% of the thickness of the recording layer.

Preferable as the thickness of the recording thin film of this invention is a range of from 15 nm to 150 nm inclusive, and especially preferable is a range of from 20 nm to 80 nm inclusive.

Preferably the formation of the recording thin film on the disk substrate is carried out by the multi-source rotating vacuum evaporation wherein the substrate is rotated and a plurality of vaporizing sources are employed as will be stated in examples. Preferably the evaporation time is between 15 seconds and 2 minutes inclusive, and the rotational frequency is between 100 $min^{-1}$ and 2,000 $min^{-1}$ inclusive.

Hereunder, this invention will be described in detail along the examples.

EXAMPLE 1

Figure 2:
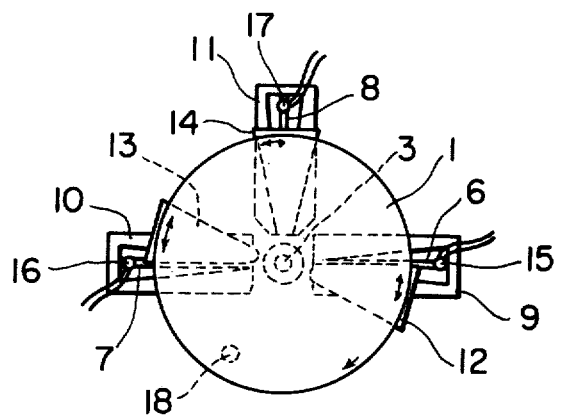
FIG. 2 is a view for explaining an evaporation equipment for use in the fabrication of a recording member according to this invention.

Using a vacuum evaporation equipment of an internal structure shown as a plan view in FIG. 2, a recording thin film was evaporated. A polymethyl-methacrylate resin disk having a diameter of 31 cm and a thickness of 1 mm was coated with photoresist AZ1350J (produced by Shipley Inc.) to a thickness of about 2,000 Å by the use of a spinner, and then baked. Subsequently, the resultant substrate 1 was rotated about a central shaft 3 at a rotational frequency of 120 $min^{-1}$. Under the substrate 1, there were boats for evaporation 6, 7 and 8. Over the boats, there were masks 9, 10 and 11 having sectoral slits and shutters 12, 13 and 14. The rates of vaporization were detected by quartz oscillator type film thickness monitors 15, 16 and 17. Further, the thickness of an evaporated film could be checked by detecting the transmissivity of light by means of a light projector 18 and a light receptor which was arranged under the projector with the substrate 1 and the film intervening therebetween.

Sb was put in the boat 6, while Bi was put in the boat 7. The boat 6 had a structure in which the evaporation material contained therein was not seen from the position of the substrate. The boat 8 was to be employed in case of forming a chalcogenide layer or an oxide layer. Currents were caused to flow through the boats 6 and 7, and the ratio of the vaporing matters from the respective boats was set so that Bi:Sb might become approximately 5:1 in terms of the ratio of the numbers of atoms. After the materials in the boats vaporized a little, the shutters 12 and 13 were opened, and the opening angles of the shutters were so adjusted that the slit on the Bi side was fully open and that the slit on the Sb side was open about 1/6. When the total film thickness became approximately 350 Å, the shutters were closed to complete the evaporation. The Sb content of the Bi-Sb thin film obtained was 4%.

In order to record information in the Bi-Sb thin film formed on the substrate as described above, while the substrate 1 having the thin film 2 was being rotated at a rotational frequency of 1,800 $min^{-1}$ as illustrated in FIG. 1, an argon ion laser beam of a wavelength of 488 nm the pulses of which had their widths and intervals modulated by NTSC video signals to-be-recorded was condensed by a lens and was projected onto the thin film 2 through the substrate 1 from the substrate side. The laser beam power was made approximately 50 mW. Those parts of the thin film 2 on which the laser beam was projected were formed with elliptical openings 5 which had minor diameters of approximately 0.8 μm.

The read-out of the recording was carried out as follows. The substrate was rotated at the rotational frequency of 1,800 min$^{-1}$, a He-Ne laser beam having a power of approximately 2 mW was condensed by a lens and projected from the substrate side, and changes in the intensity of reflected light were detected by means of a detector.

The signal-to-noise ratio was measured as follows. Instead of video signals, a carrier at 8 MHz was recorded in the thin film and then read out. A signal-to-noise ratio measured at the read-out was converted into one in the case of color video signals.

Figure 3:
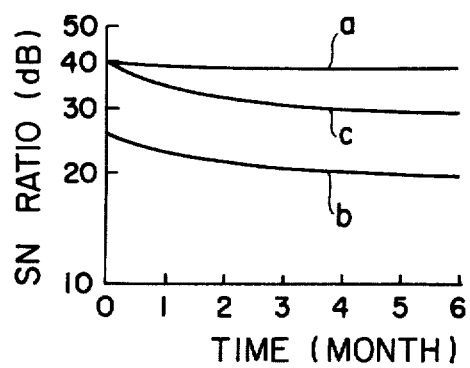
FIG. 3 is a diagram showing the changes of the characteristics of several recording films with the lapse of time.

In case where the recording member obtained in the example stated above was read out by the reflection method, a signal-to-noise ratio of about 40 dB was attained. Even after lapse of about six months, the degradation of the signal-to-noise ratio was less than 2 dB. In contrast, with a thin film which was made of only Bi, the signal-to-noise ratio immediately after the formation of the film was low, and it degraded more than 3 dB after six months. With an Sn-Bi-based material, the signal-to-noise ratio degraded as much as about 10 dB after the period. The situation is illustrated in FIG. 3. A curve a corresponds to the recording member of this invention, and a curve b the example of the recording member made of only Bi. A curve c corresponds to the example of the recording member employing Sn-Bi.

Figure 4:
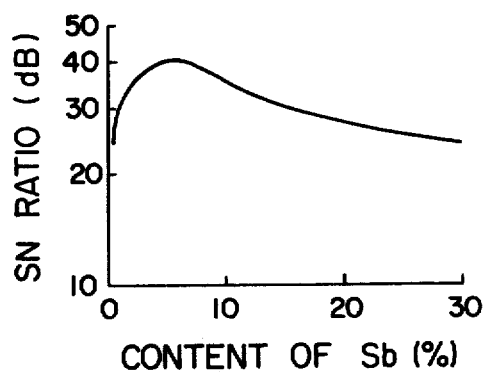
FIG. 4 is a diagram showing the variation of recording characteristics versus the Sb contents of recording members which employ Bi-Sb alloys.

When, in the formation of the thin film with the evaporation equipment stated above, the opening angle of the shutter on the Sb side was varied to vary the Sb content of the thin film, the signal-to-noise ratio varied as follows. As indicated in FIG. 4, the signal-to-noise ratio was about 30 dB for an Sb content of 1%, about 35 dB for 2%, about 40 dB for 4%, about 35 dB for 10%, about 30 dB for 15%, and about 25 dB for 30%. When the thickness of the Bi-Sb film was varied, the signal-to-noise ratio varied as follows. It was 25 dB for a thickness of 10 nm, 30 dB for 15 nm, 35 dB for 20 nm, 35 dB for 80 nm, and 30 dB for 150 nm.

EXAMPLE 2

Figure 5:
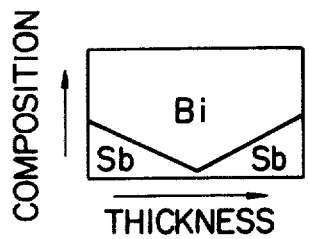
FIGS. 5 to 7 are explanatory diagrams showing several models on the composition profile in the thickness direction of a recording film.

Although set conditions in the evaporation equipment, a substrate employed, etc. were the same as in Example 1, the opening angle of the shutter for Sb was not held constant. Simultaneously with fully opening the shutter for Bi, the shutter for Sb was opened to open the slit ⅓. It was gradually closed, and was fully closed when the thickness of an evaporated film became 175 A. The shutter was immediately started opening again, and the opening angle was gradually increased so that the slit might become open ⅓ again when the film thickness became 350 A to complete the evaporation. The Sb content of the Bi-Sb film thus obtained was approximately 8% at the substrate surface and front surface of the film and 0 (zero) % at the central part thereof, and the average content was 4% as in Example 1. FIG. 5 illustrates the variation of the composition of the evaporated film in this example as taken versus the thickness direction.

The recording method and the recording reading-out method for the recording member thus fabricated were the same as in Example 1.

Also in the present example, a signal-to-noise ratio of approximately 40 dB was attained, and its deterioration with the lapse of time was less than in Example 1.

Figure 6:
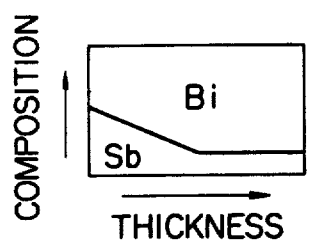

With another sample, the Sb content was made 8% at the substrate surface of an evaporated film. Subsequently, likewise to the foregoing, the slit had the opening angle gradually closed and adjusted so that the Sb content might become 2% at a film thickness of 175 A. Further, a recording layer having the Sb content of 2% was formed on the resultant film until the total thickness became 350 A. FIG. 6 illustrates the variation in the thickness direction, of the composition of this sample.

Figure 7:
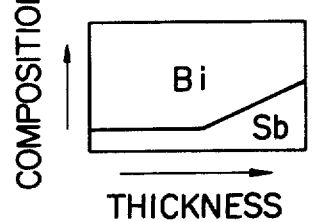

Conversely, a Bi-Sb layer having the Sb content of 2% was formed from the substrate surface of a film to the thickness of 175 A, whereupon the Sb content was gradually increased by a method similar to the above so as to form a recording layer having the thickness of 350 A and getting at the Sb content of 8%. FIG. 7 illustrates the variation in the thickness direction, of the composition of this sample.

These two samples could achieve good signal-to-noise ratios, and the changes thereof with the lapse of time were equivalent to those in Example 1.

What is claimed is:

1. A member for recording information by forming apertures or recesses in a thin film owing to heat generated by projecting a recording beam onto the thin film, comprising a thin film on a substrate, wherein said thin film comprises an antimony-bismuth alloy having an antimony content lying within a range of from 1% to 15% inclusive in terms of percentage of an average number of atoms in a thickness direction of said thin film, whereby deterioration of the recording characteristic of the thin film with aging of the member is suppressed.

2. A member for recording information as defined in claim 1, wherein the maximum Sb content of one part of said thin film, in the thickness direction, is at most three times the average Sb content of the remainder of said thin film, in the thickness direction.

3. A member for recording information as defined in claim 1, wherein said thin film has a thickness of at least 15 nm and at most 150 nm.

4. A member for recording information as defined in claim 1, wherein said thin film has one surface adjacent said substrate and a second surface opposite said one surface, and wherein the antimony content of said thin film, in the thickness direction, is greater in at least one of the part of the thin film near the first surface and the part of the thin film near the second surface than the average antimony content of the remainder of said thin film.

5. A member for recording information as defined in claim 1, wherein said thin film has one surface adjacent said substrate and a second surface opposite said one surface, and wherein the antimony content of said thin film, in the thickness direction is greater in both the part of the thin film near the first surface and the part of the thin film near the second surface than the average antimony content of the remainder of said thin film.

6. A member for recording information as defined in claim 4 or 5, wherein said thin film includes a region of substantially pure antimony extending in the thickness direction, said substantially pure antimony region being no more than 5 nm thick.

7. A member for recording information as defined in claim 1, 4 or 5, wherein said thin film further comprises up to 10 atom percentage of at least one element selected from the group consisting of indium and zinc.

8. A member for recording information as defined in claim 2, wherein said thin film further comprises up to 10 atom percentage of at least one element selected from the group consisting of indium and zinc.

9. A member for recording information as defined in claim 3, wherein said thin film further comprises up to 10 atom percentage of at least one element selected from the group consisting of indium and zinc.

10. A member for recording information as defined in claim 6, wherein said thin film further comprises up to 10 atom percentage of at least one element selected from the group consisting of indium and zinc.

11. A member for recording information as defined in claim 2, wherein said thin film includes a region of substantially pure antimony extending in the thickness direction, said substantially pure antimony region being no more than 5 nm thick.

12. A member for recording information as defined in claim 2, wherein said thin film has a thickness of at least 15 nm and at most 150 nm.

13. A member for recording information as defined in claim 1, wherein the antimony content lies within a range of 2% to 10% inclusive in terms of percentage of an average number of atoms in a thickness direction of said thin film.

14. A member for recording information as defined in claim 1, wherein a layer of a material selected from the group consisting of a chalcogenide, an oxide and an organic polymer is disposed between the substrate and the thin film.

15. A member for recording information as defined in claim 1, wherein a layer of a material selected from the group consisting of a chalcogenide, an oxide and an organic polymer is positioned on the surface of the thin film opposite to the thin film surface adjacent the substrate.

16. A member for recording information as defined in claim 14 or 15, wherein said layer is made of a chalcogenide, said chalcogenide being selected from the group consisting of Ge-Se, Ge-S, Ge-Te, Sb-S, Sb-Se, Sn-S, Sn-Se, In-Se, As-Te, As-Se, and As-S.

17. A member for recording information as defined in claim 14 or 15, wherein said layer is made of an oxide, said oxide being selected from the group consisting of oxides of Te, of Sb, of Cd, of Bi, of Ge and of Si.

18. A member for recording information as defined in claim 14 or 15, wherein the thickness of said layer is not greater than 40% of the thickness of the thin film.

19. A member for recording information as defined in claim 3, wherein said thin film has a thickness of from 20 nm to 80 nm inclusive.

20. A member for recording information as defined in claim 1, wherein said member consists essentially of said thin film on said substrate, and said thin film consists essentially of said antimony-bismuth alloy.

* * * * *